United States Patent [19]

Sezai

[11] Patent Number: 5,243,352
[45] Date of Patent: Sep. 7, 1993

[54] METHOD FOR PROCESSING ANTENNA PATTERNS

[75] Inventor: Toshihiro Sezai, Tokyo, Japan

[73] Assignee: National Space Development Agency of Japan, Tokyo, Japan

[21] Appl. No.: 933,944

[22] Filed: Aug. 24, 1992

[30] Foreign Application Priority Data

Sep. 11, 1991 [JP] Japan .................................. 3-258773
Sep. 11, 1991 [JP] Japan .................................. 3-258774

[51] Int. Cl.$^5$ .......................... G01S 3/16; G01S 3/28
[52] U.S. Cl. ........................................................... 342/382
[58] Field of Search ............................................. 342/382

[56] References Cited

U.S. PATENT DOCUMENTS 4,612,549  9/1986  Geyer, Jr. et al. .................. 342/382
4,888,594  12/1989  Friedman et al. .................. 342/382

Primary Examiner—Theodore M. Blum
Attorney, Agent, or Firm—Armstrong, Westerman, Hattori, McLeland & Naughton

[57] ABSTRACT

An antenna system comprises: a main antenna; a first sub antenna arranged in such a way that the first sub antenna adjoins the main antenna in the X direction which is the orientation of a beam width of the main antenna to be reduced and the beam axis of the first sub antenna coincides with the beam axis of the main antenna; and a second sub antenna arranged in such a way that the second sub antenna adjoins the main antenna in the Y direction perpendicular to the X direction and the beam axis of the second sub antenna coincides with the beam axis of the main antenna; wherein an antenna beam of the antenna system is scanned in a direction other than the X and Y direction and multiplication is carried out between a signal received with the main antenna and each signal received with each sub antenna on the condition that phases of these signals coincide with each other so that a two-dimensional reduction in a beam width is achieved. When the second sub antenna does not have an isotropic antenna pattern in the X direction and the beam-scanning is carried out in the X direction, a one-dimensional reduction in a beam width and side lobes is achieved. When the second sub antenna does not have an isotropic antenna pattern in the X direction and the beam-scanning is carried out in a direction other than the X and Y direction, a two-dimensional reduction in a beam width and a one-dimensional reduction in side lobes is achieved. In the case that the first and second sub antennas do not have isotropic antenna patterns in the Y and X direction respectively and the antenna beam is scanned in a direction other than the X and Y direction, a two-dimensional reduction in a beam width and two-dimensional reduction in side lobes are achieved.

24 Claims, 9 Drawing Sheets

METHOD FOR PROCESSING ANTENNA PATTERNS

BACKGROUND OF THE INVENTION

1. Field of the Invention

The present invention relates to a method for processing antenna patterns, more specifically, a method for two-dimensional beam compression processing which reduces antenna patterns two-dimensionally and a method for reducing a beam width as well as side lobes.

2. Description of the Related Art

A beam width and a side lobe are indices for describing the characteristics of antenna patterns of general antennas including receiving antennas. Narrower beam widths or lower side lobes give better antenna pattern characteristics.

However, the beam width shows an antinomical relationship with side lobes. Besides, the beam width is inversely proportional to an antenna size (length). That is, when the size of an antenna is constant, a reduction in the beam width results in an increase in side lobes and a reduction in side lobes leads to an increase in beam width. When the size of an antenna is modified, a reduction in beam width results in an increase in antenna size and a reduction in an antenna size results in an increase in beam width.

Therefore, for example, in radar antennas, regarding a relationship between a beam width and a side lobe, when side lobes are reduced, then the beam width is widened and the resolution or the ability to discriminate targets gets degraded. As a result, the radar could misidentify plural targets as single target. On the other hand, when the beam width is reduced, side lobes become high and the radar might misidentify a target which exists in the direction of certain side lobes even though it exists in the observation direction, although there is nothing in the observation direction. As for a relationship between a beam width and an antenna size, when the beam width is reduced by half in order to increase the ability to discriminate the target by a factor of two, then the antenna size necessarily becomes twice as large. Such an increase in size leads to various kinds of problems, such as an increase in occupied space, an increase in the weight of the antenna, and an increase in the size of the structure for supporting the antenna. On the other hand, a reduction in the size of the antenna by half results in a two-fold increase in the beam width by twice, thus decreasing the discrimination ability by half.

As described above, the beam width and the side lobes have characteristics conflicting with each other, hence it is impossible to optimize both of these at the same time. Therefore a compromise is required between a beam width and side lobes. A possible compromise has been to take a certain distribution such as Chebyshev distribution so that the beam width is minimized whenever a certain condition exists regarding the side lobes, or side lobes are minimized regarding a certain condition of a beam width. On the other hand, because there is a conflicting relation between the beam width and the antenna size, as shown above, and moreover, because there is a limitation in space for the antenna to occupy in most actual cases, a compromise has been made so that a moderate beam width is obtained under these restrictions.

As for a method to partially solve such problems, a multiplicative array is known as a method for reducing beam widths by multiplying each signal with each other received with plural antennas. FIG. 1 shows the constitution of such an antenna which reduces beam widths. In this figure, 101 is a main antenna such as an array antenna comprising plural radiating elements arranged along a straight line with equal spaces and 102 is a reference antenna. The reference antenna 102 is arranged apart from the main antenna 101 in the X direction which is the orientation of the beam width to be reduced. 103 is a multiplier which multiplies the signal received with the main antenna 101 by the signal received with the reference antenna 102. In an antenna systems having such a constitution, each signal received with antennas 101 and 102 is applied to the multiplier 103 with the same phase to perform the multiplication between the directional characteristic of the main antenna 101 and that of the reference antenna so that the resulting synthesized directional characteristic shows a reduction in the beam width.

In the above conventional method for reducing the beam width, the reference antenna 102 is arranged to adjoin the main antenna 101 in only one direction. Therefore, only a one-dimensional reduction in the beam width is possible and, as a result, the discrimination ability is inadequate. In the case that a main beam has such a pattern 201 shown in FIG. 2A, which has no reduction in a beam width, it is impossible to discriminate five targets a, b, c, d, and e each other. When this pattern is reduced one-dimensionally in the X direction, then the resultant reduced pattern becomes such a pattern 202 shown in FIG. 2B. Even in this case, while the ability of the discrimination is improved compared to the case with no reduction in a beam width, there is still a problem that it is impossible to discriminate three targets a, c, and e each other, thus the discrimination ability is inadequate.

Furthermore, it should be noted that the above conventional method for reducing the beam width has the problem that only a one-dimensional reduction in the beam width is possible and it is impossible to reduce side lobes in addition to the beam width at the same time because the reference antenna 102 is arranged to adjoin the main antenna 101 only in one direction.

SUMMARY OF THE INVENTION

It is an object of the present invention to solve the problems described above. More specifically, it is a first object of the present invention to provide a method for two-dimensionally reducing the beam width in an antenna pattern to improve the discrimination ability. It is a second object of the present invention to provide a method for processing an antenna pattern to make a one-dimensional reduction in side lobes as well as a one-dimensional reduction in a beam width. It is a third object of the present invention to provide a method for processing an antenna pattern to make a one-dimensional reduction in side lobes as well as a two-dimensional reduction in a beam width. It is a fourth object of the present invention to provide a method for processing an antenna pattern to make a two-dimensional reduction in side lobes as well as a two-dimensional reduction in a beam width.

In the present invention to achieve the first object described above, an antenna system comprises a main antenna for receiving radio waves; one or more first sub antennas arranged in such a way that these first sub antennas adjoin the main antenna in a first direction which is the orientation of the beam width to be reduced of the main antenna and the beam axes of the first sub antennas coincide with the axis of the main antenna; and one or more second sub antennas arranged in such a way that these second sub antennas adjoin the main antenna in a second direction perpendicular to the first direction and the axes of the second sub antennas coincide with the axis of the main antenna. In this antenna system, the antenna beam is scanned in a direction other than either the first direction or the second direction, and after making the multiplication between the signal received with the main antenna and the signal received with the first sub antenna with coincidence in phases, the resultant multiplied output is multiplied by the signal received with the second sub antenna with coincidence in phases.

When the antenna beam is, as described above, scanned in a direction other than either the first direction or the second direction and the signal received with the main antenna is multiplied by the signal received with the first sub antenna with coincidence in phases, the beam width in the first direction is reduced according to the principle of the multiplicative array. Furthermore, the resultant multiplied output is multiplied by the signal received with the second sub antenna with coincidence in phases to reduce the beam width in the second direction. The first and second sub antennas can be made small in size compared to the main antenna, therefore it is possible to make a two-dimensional reduction in the beam width of the main antenna with almost no change in the antenna size.

In the present invention to achieve the second object described above, an antenna system comprises a main antenna for receiving radio waves; one or more first sub antennas arranged in such a way that these first sub antennas adjoin the main antenna in a first direction which is the orientation of the beam width to be reduced of the main antenna and that the beam axes of the first sub antennas coincide with the axis of the main antenna; and one or more second sub antennas which do not have an isotropic antenna pattern in the first direction which are arranged in such a way that these second sub antennas adjoin the main antenna in a second direction perpendicular to the first direction and the axes of the second sub antennas coincide with the axis of the main antenna. In this antenna system, the antenna beam is scanned in the first direction described above, and after making the multiplication between the signal received with the main antenna and the signal received with the first sub antennas with coincidence in phases, the resultant multiplied output is multiplied by the signal received with the second sub antennas with coincidence in phases.

In this method for processing the antenna pattern with such a constitution, the antenna beam is scanned in the first direction and the signal received with the main antenna is multiplied by the signal received with the first sub antenna with coincidence in phases, then the beam width in the first direction is reduced according to the principle of the multiplicative array. Furthermore, the resultant multiplied output is multiplied by the signal received with the second sub antenna with coincidence in phases, then the side lobes in the first direction are reduced.

In general cases, except for the special isotropic case, an antenna pattern shows the maximum magnitude in the beam axis direction. Let the maximum magnitude be 1 (that is, the magnitude is normalized with respect to the maximum magnitude), then any magnitude, except for in the beam axis direction, is less than 1. Therefore, when the product between the output of the main antenna and the output of the first sub antenna is further multiplied by the signal received with the second sub antenna which does not have an isotropic antenna pattern in the first direction by a means of multiplication, the pattern synthesized from the pattern of the main antenna and the pattern of the first sub antenna is further multiplied by the pattern of the second sub antenna having values less than 1 except for in the beam axis direction. Hence, after the multiplication by the pattern of the second sub antenna is carried out, the values become less than the values synthesized from the patterns of the main antenna and the first antennas. Thus, the side lobes are reduced as well as the beam width in the first direction.

Furthermore, in the present invention to achieve the third object described above, an antenna system comprises a main antenna for receiving radio waves; one or more first sub antennas arranged in such a way that these first sub antennas adjoin the main antenna in a first direction which is the orientation of the beam width to be reduced of the main antenna and the beam axes of the first sub antennas coincide with the axis of the main antenna; and one or more second sub antennas which do not have an isotropic antenna pattern in the first direction which are arranged in such a way that these second sub antennas adjoin the main antenna in a second direction perpendicular to the first direction and the axes of the second sub antennas coincide with the axis of the main antenna. In this antenna system, the antenna beam is scanned in a direction other than either the first direction or the second direction, and after making the multiplication between the signal received with the main antenna and the signal received with the first sub antenna with coincidence in phases, the resultant multiplied output is further multiplied by the signal received with the second sub antenna with coincidence in phases.

In this method for processing the antenna pattern with such a constitution, the antenna beam is scanned in a direction other than either the first direction or the second direction and the signal received with the main antenna is multiplied by the signal received with the first sub antenna with coincidence in phases, then the beam width in the first direction is reduced according to the principle of the multiplicative array. Furthermore, the resultant multiplied output is multiplied by the signal received with the second sub antenna with coincidence in phases, then the side lobes in the first direction are reduced as well as the beam width in the second direction. Thus, it is possible to make a one-dimensional reduction in the side lobes in the first direction as well as a two-dimensional reduction in a beam width.

Moreover, in the present invention to achieve the fourth object described above, an antenna system comprises a main antenna for receiving radio waves; one or more first sub antennas which do not have an isotropic antenna pattern in a second direction perpendicular to a first direction which is the orientation of the beam width to be reduced of the main antenna which are arranged in such a way that these first sub antennas adjoin the main antenna in the first direction and the beam axes of the first sub antennas coincide with the axis of the main antenna; and one or more second sub antennas which do not have an isotropic antenna pattern in the first direction which are arranged in such a way that these second sub antennas adjoin the main antenna in the second direction perpendicular to the first direction and the axes of the second sub antennas coincide with the axis of the main antenna. In this antenna system, the antenna beam is scanned in a direction other than either the first direction or the second direction, and after making the multiplication between the signal received with the main antenna and the signal received with the first sub antenna with coincidence in phases, the resultant multiplied output is further multiplied by the signal received with the second sub antenna with coincidence in phases.

In this method for processing the antenna pattern with such a constitution, antenna beam is scanned in a direction other than either the first direction or the second direction and the signal received with the main antenna is multiplied by the signal received with the first sub antenna with coincidence in phases, then the side lobes in the second direction are reduced for the same reason as in the invention for the second object described above as well as the beam width in the first direction is reduced according to the principle of the multiplicative array. Furthermore, the resultant multiplied output is multiplied by the signal received with the second sub antenna with coincidence in phases, then the side lobes in the first direction are, in a similar way, reduced as well as the beam width in the second direction. Thus, the two-dimensional reduction in the side lobes is achieved as well as the two-dimensional reduction in the beam width.

DESCRIPTION OF THE PREFERRED EMBODIMENTS

Figure 3:
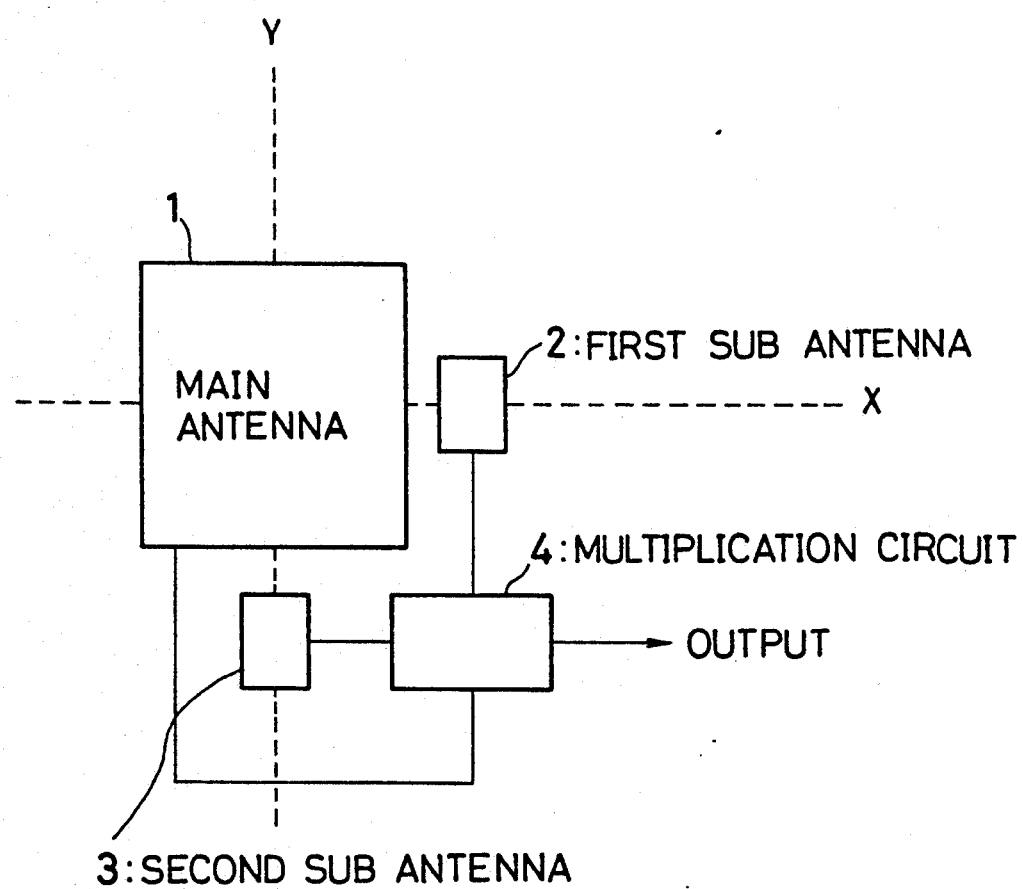
FIG. 3 is a schematic diagram showing an antenna system used for explanation of a method for processing an antenna pattern according to a first embodiment of the present invention.

Explanation of embodiments of this invention is given in the following description. FIG. 3 is a schematic diagram showing an antenna system used for explanation of an apparatus and method for processing an antenna pattern according to the first embodiment of the present invention. This embodiment relates to an apparatus and method for making a two-dimensional reduction in a beam width in an antenna pattern to achieve the first object of the present invention. In this figure, main antenna 1 receives radio waves and can be a horn antenna or an array antenna. First sub antenna 2 is arranged in such a way that it adjoins the main antenna 1 in the X direction and its beam axis coincides with the beam axis of the main antenna 1 so that the beam width in the X direction in the antenna pattern of the main antenna 1 is reduced. Second sub antenna 3 is arranged in such a way that it adjoins the main antenna 1 in the Y direction perpendicular to the X direction and its beam axis coincides with the beam axis of the main antenna 1 so that the beam width in the Y direction in the antenna pattern of the main antenna 1 is reduced. Multiplication circuit 4 multiplies the signal received with the main antenna 1 by the signal received with the first sub antenna and this resultant multiplied output signal is further multiplied by the signal received with the second sub antenna.

When radio waves arrive at such an antenna system whose antenna beam is scanned in a direction other than either the X direction or the Y direction, the main antenna 1, the first sub antenna 2, and the second sub antenna 3 output the received signals depending on each antenna pattern, respectively. These output signals are sequentially multiplied by the multiplication circuit 4, and the output of the multiplier gives the final output corresponding to the main antenna pattern with a two-dimensionally reduced beam width according to the principle of the multiplicative array.

Figure 4A:
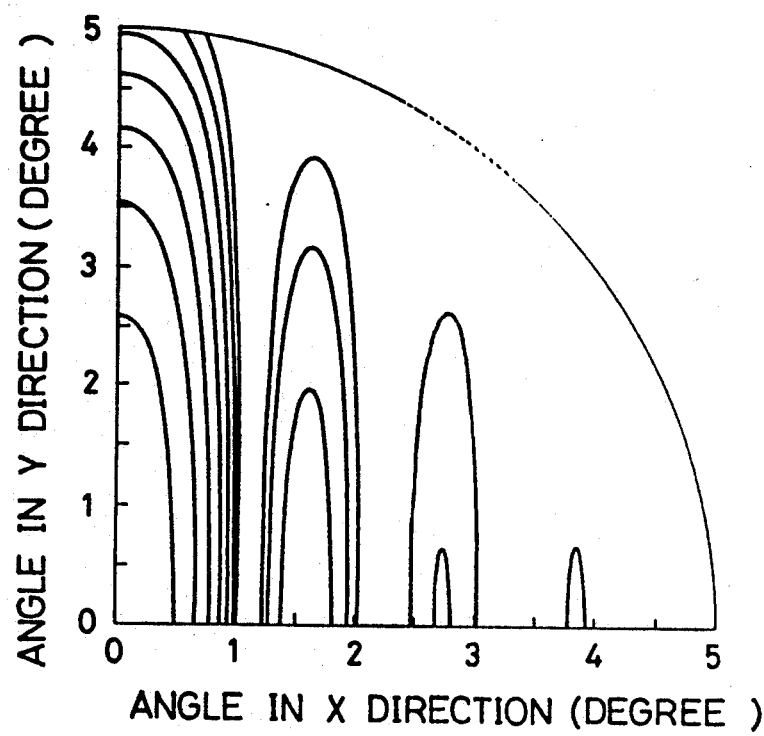
FIG. 4A and 4B are graphs showing an antenna pattern of the main antenna of FIG. 3 and a synthesized pattern after multiplication processing is carried out.
Figure 4B:
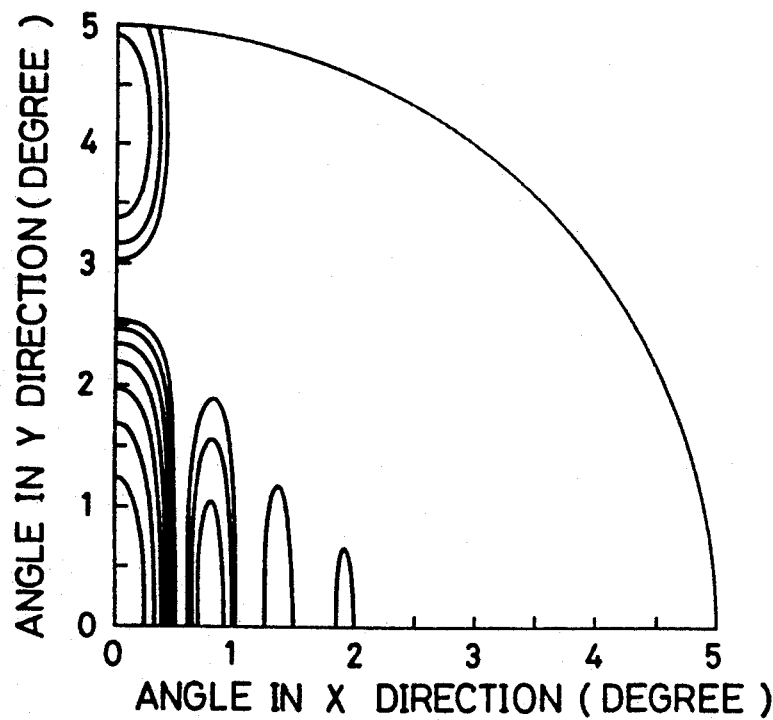

FIG. 4A and 4B show simulated characteristics of an antenna system comprising a main antenna having 65×17 matrix-arrayed elements with uniform aperture distribution in both X and Y directions, or more specifically, 65 elements arranged in the X direction (The length in the X direction is about twelve times as large as a wavelength of received radio waves.) and 17 elements arranged in the Y direction (The length in the Y direction is about three times as large as a wavelength of received radio waves.) each of which comprises a half-wave dipole antenna with a reflector (with a space of a quarter of wavelength between a dipole and a reflector), and the first and second sub antennas each of which comprises one element having the same structure as that of the above element. FIG. 4A shows a pattern of the main antenna and FIG. 4B shows the pattern after two-dimensional reduction in the beam width is performed. In these figures, patterns are represented by contour lines corresponding to −3, −6, −9, −12, −15, −18, and −21 dB where the value at the origin is taken as a reference. As can be seen from these patterns, the simulation shows that it is possible to reduce two-dimensionally the beam widths in both X and Y directions to about a half. In this simulation, each antenna element is composed of the array element having the same structure. The sizes of the first and second sub antennas can be made small compared to the size of the main antenna, therefore the total size is almost same as the size of an antenna with no beam width reduction.

Figure 1:
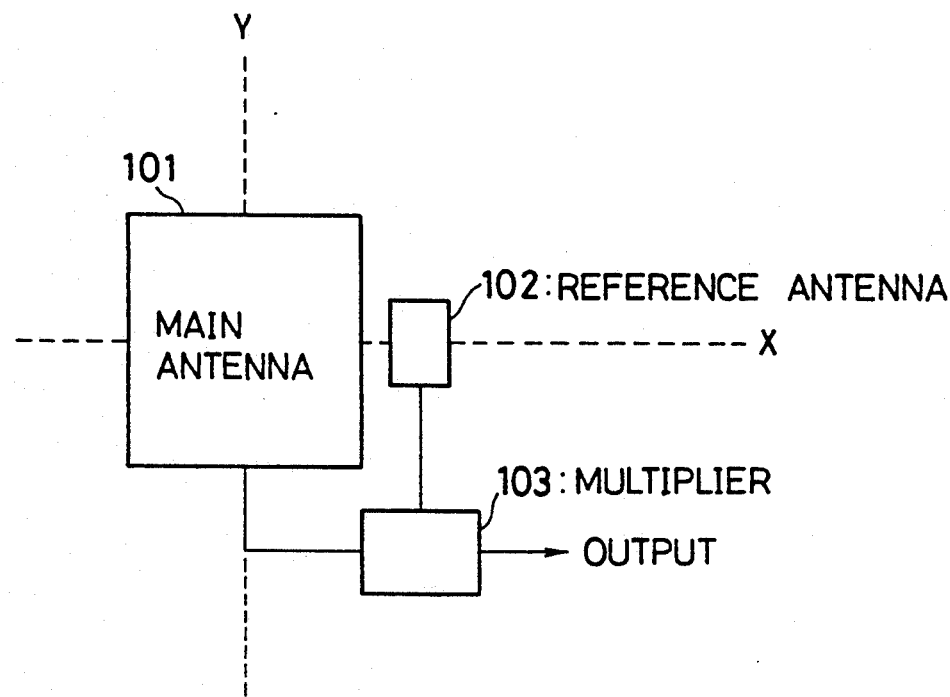
FIG. 1 is a schematic diagram of a conventional antenna system for one-dimensional reduction in a beam width.
Figure 2A:
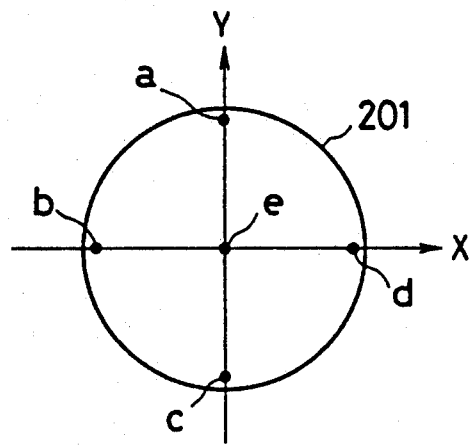
FIGS. 2A and 2B are schematic diagrams for explanation of the discrimination ability of the main beam of the conventional antenna system of FIG. 1.
Figure 2B:
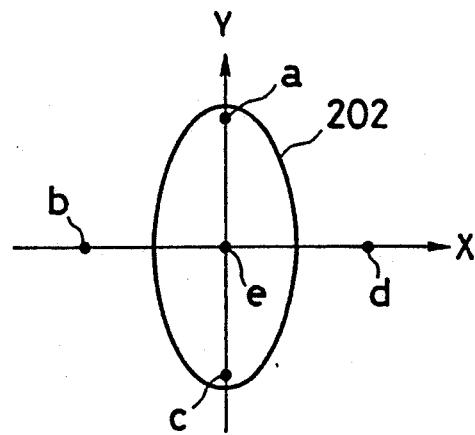
Figure 5:
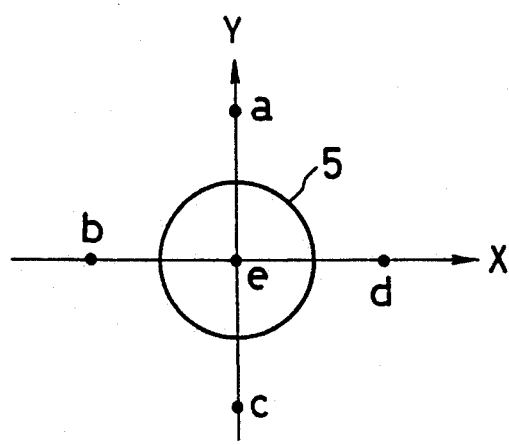
FIG. 5 is a schematic diagram showing a two-dimensionally reduced main beam pattern for explanation of improvement in discrimination ability due to a two-dimensional reduction in a beam width.

It is shown how the discrimination ability is improved by the two-dimensional reduction in the beam width in FIG. 5 which is similar to FIG. 2A and 2B. That is, after two-dimensional reduction in a beam width is carried out, the main beam becomes like pattern 5, thus it is possible to discriminate targets a, b, c, d, and e each other as a result of the improvement in discrimination ability.

Figure 6:
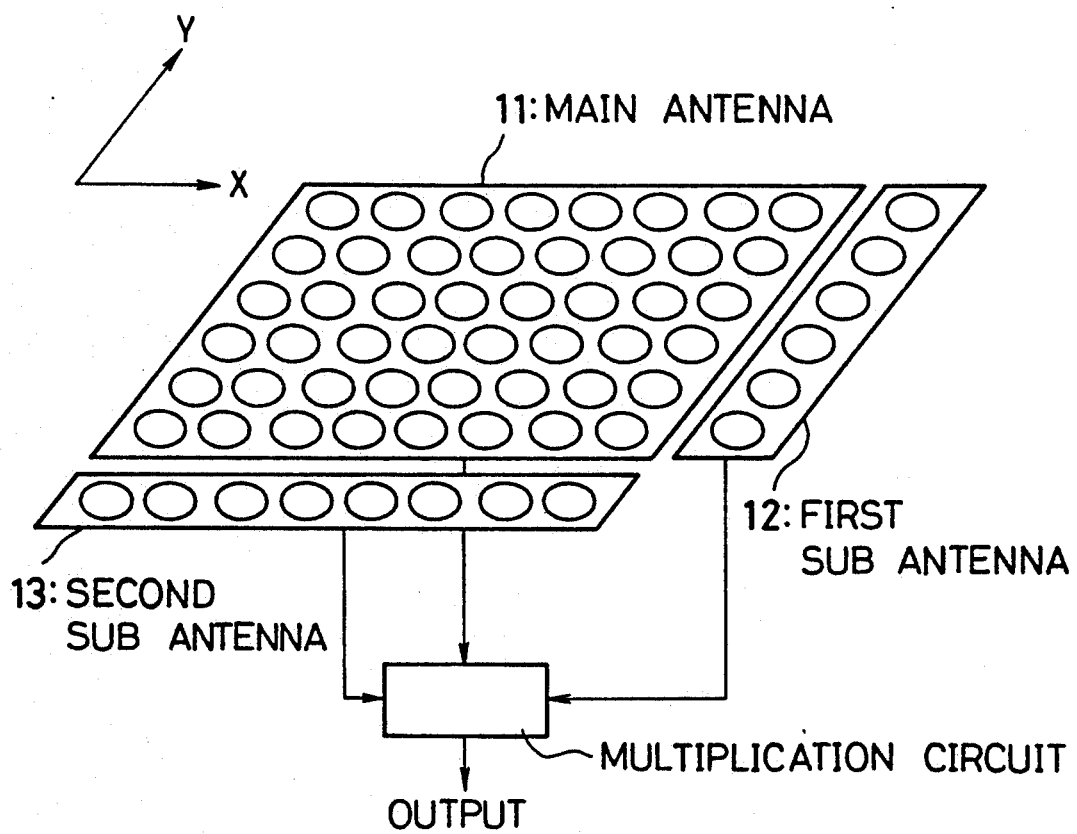
FIG. 6 is a schematic diagram showing a concrete constitution of an antenna system utilized in a first embodiment.

Referring by FIG. 6, an example of the antenna system is described more concretely. In this example, circular patch array antennas are utilized for each of a main antenna 11, a first sub antenna 12 and a second sub antenna 13, and the first sub antenna 12 is arranged apart from the main antenna 11 in the X direction and the second sub antenna 13 is arranged apart from the main antenna in the Y direction.

Figure 7:
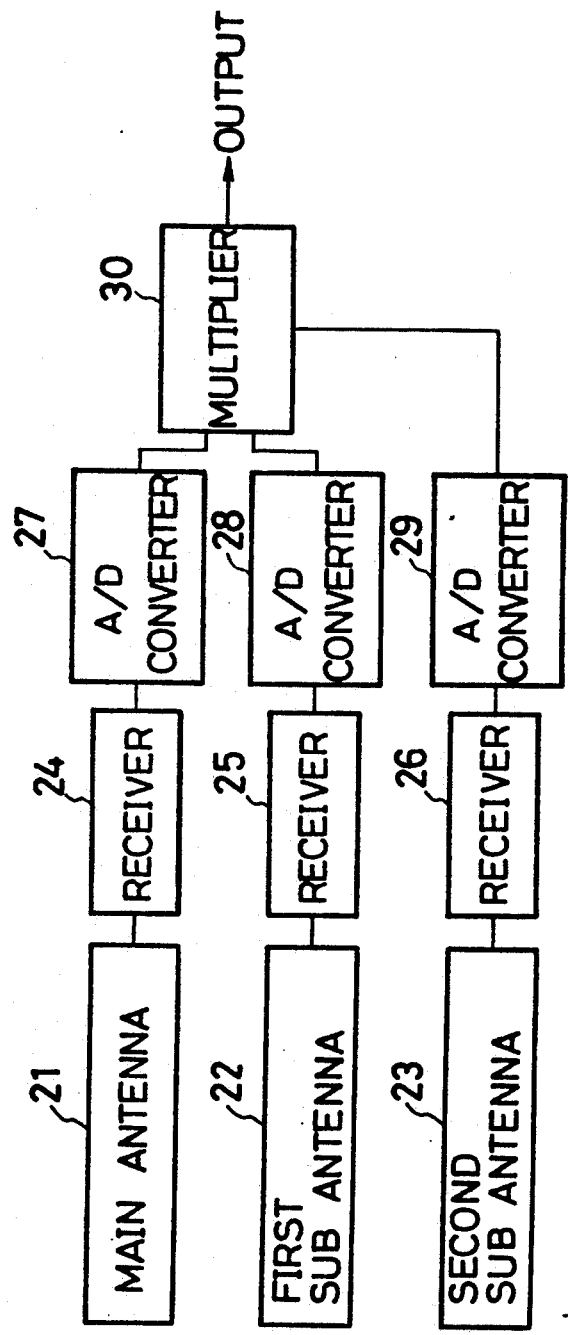
FIG. 7 is a block diagram showing a concrete constitution of a multiplication circuit utilized in a first embodiment.

As for a multiplication circuit, when the multiplication is carried out in an analog way, common multiplier circuits or frequency modulators can be used. In order to perform multiplication digitally, known means are available, for example, such a means that after the received signal is converted to a digital signal by an analog-to-digital converter, digital multiplication is carried out. An example of such a means is shown in FIG. 7. In this figure, 21 is a main antenna, 22 is a first sub antenna, 23 is a second sub antenna, 24, 25 and 26 are receivers for receiving the radio waves caught by each antenna, 27, 28 and 29 are analog-to-digital converters which convert the output signal of the receiver 24, 25 and 26 to digital signals, and 30 is a multiplier for making the product of the outputs of analog-to-digital converter 27, 28 and 29. In this multiplication circuit, the radio waves received with the main antenna 21, the first sub antenna 22 and the second sub antenna 23 are applied to the receivers 24, 25 and 26 to output the DC signals corresponding to the power of received radio waves. These receiver output signals are applied to the analog-to-digital converter 27, 28 and 29 to convert the signals into digital data. Furthermore, these digital data are multiplied by the multiplier 30 and the resultant multiplied value is output.

In the above embodiment, single first sub antenna and single second sub antenna are used but plural first sub antennas or plural second sub antennas can be used. Besides, any kinds of antennas are applicable such as a dipole antenna, a horn antenna and an array antenna. When plural antennas are used for the first and second sub antenna, there are two following methods available for multiplication. In the first method, after adding each output of the first plural sub antennas and adding each output of the second plural sub antennas separately, the resultant each added output is multiplied by the output of the main antenna. In this case, the sub antennas receive more radio power than the single sub antenna, thus better antenna gains and better signal-to-noise ratios are obtained. In the second method, each output of the plural sub antennas is separately and directly multiplied by the output of the main antenna. In this case, a reduction in side lobes can be achieved as well as a reduction in a beam width.

Figure 8:
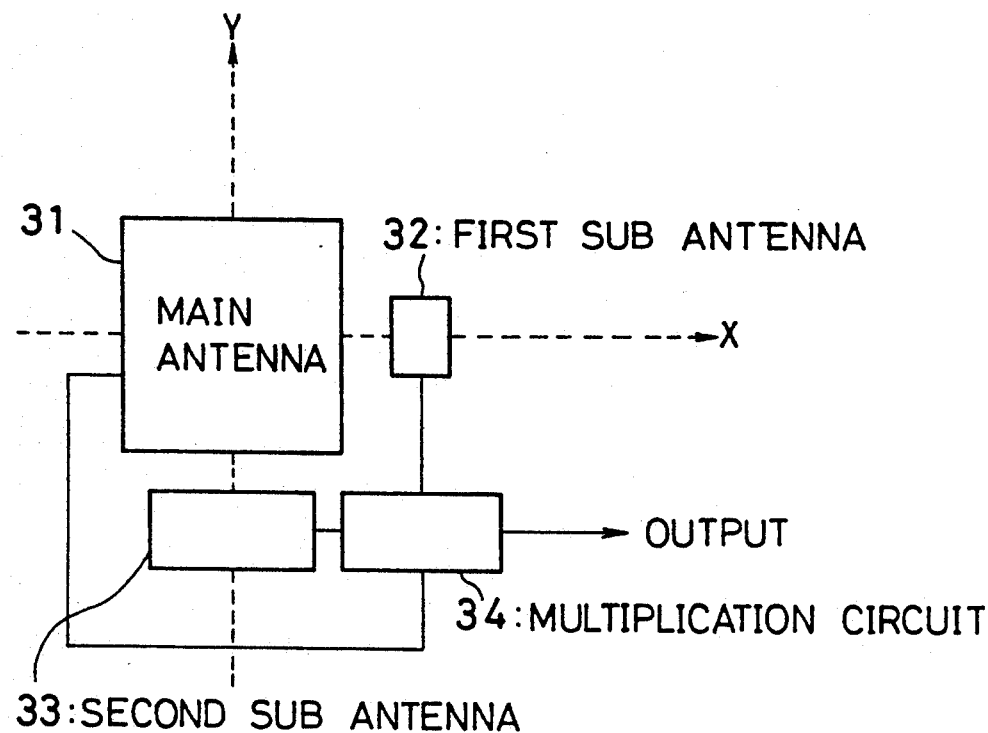
FIG. 8 is a schematic diagram showing a constitution of an antenna system for explanation of a second embodiment.

The explanation of the second embodiment of this invention is given next. This embodiment relates to an apparatus and method for making a one-dimensional reduction in a beam width and a one-dimensional reduction in side lobes to achieve the second object of the present invention. FIG. 8 is a conceptual diagram showing an antenna system for explanation of the second embodiment. In this figure, main antenna 31 receives radio waves, and can be a horn antenna or an array antenna. First sub antenna 32 is arranged in such a way that it adjoins the main antenna 31 in the X direction and its beam axis coincides with the beam axis of the main antenna 31 so that the beam width in the X direction in the antenna pattern of the main antenna 31 is reduced. Second sub antenna 33 is arranged in such a way that it adjoins the main antenna 31 in the Y direction perpendicular to the X direction and its beam axis coincides with the beam axis of the main antenna 31 so that the side lobe in the X direction in the antenna pattern of the main antenna 31 is reduced.

Any kind of antenna can be used for the first sub antenna 32 such as a dipole antenna, a horn antenna and a ray antenna. As for the second sub antenna 33, on the other hand, any kind of antenna can be also used except for an antenna having an isotropic pattern in the X direction. 34 is a multiplication circuit whereby the signal received with the main antenna 31 is multiplied by the signal received with the first sub antenna 32 and this resultant multiplied output signal is furthermore multiplied by the signal received with the second sub antenna 33.

When radio waves arrive at such an antenna system whose antenna beam is scanned in the X direction, the main antenna 31, the first sub antenna 32, and the second sub antenna 33 output the received signals depending on each antenna pattern respectively. These output signals are multiplied by the multiplication circuit 34, and the output of the multiplication circuit gives the final output corresponding to the antenna pattern of the main antenna where the beam width is reduced in the X direction as well as side lobes are reduced.

Figure 9:
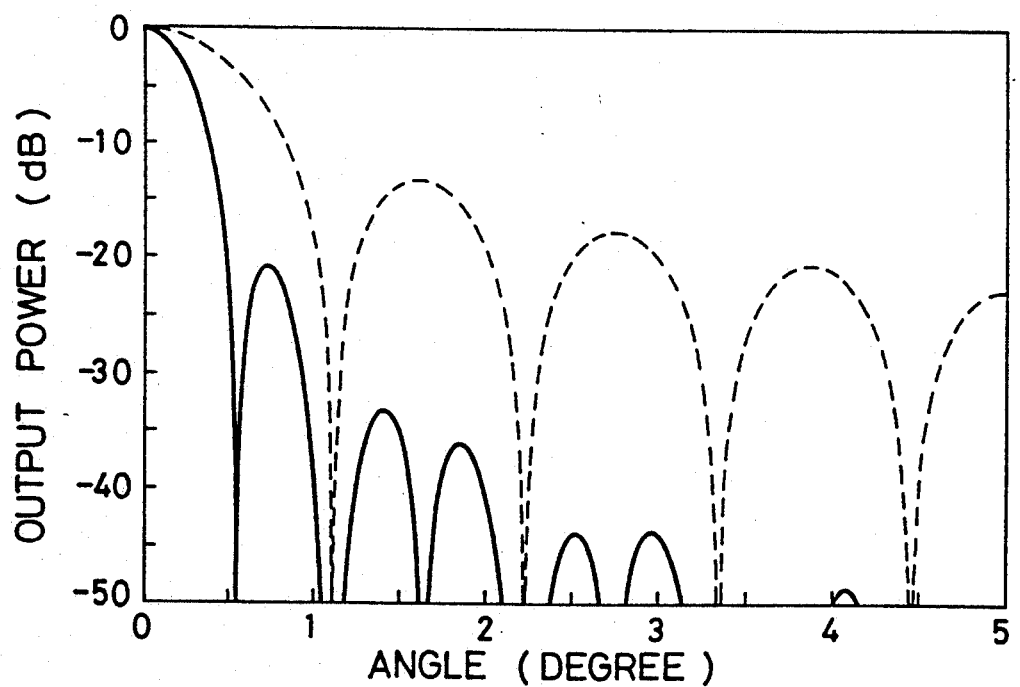
FIG. 9 is a graph showing a synthesized pattern obtained by the method for processing an antenna pattern according to the second embodiment.

FIG. 9 shows simulated characteristics of an antenna system comprising a main antenna having 65×17 matrix-arrayed elements with uniform aperture distribution in both X and Y directions, or more specifically, 65 elements arranged in the X direction (The length in the X direction is about twelve times as large as a wavelength of received radio waves.) and 17 elements arranged in the Y direction (The length in the Y direction is about three times as large as a wavelength of received radio waves.) each of which comprises a half-wave dipole antenna with a reflector (with a space of a quarter of wavelength between a dipole and a reflector), and the first sub antenna having 1×17 array elements same as the above element and the second sub antenna having 65×1 same array elements. In this figure, the pattern of the output power is represented by the relative value in dB, taking the value at the direction where X=0 as a reference. Broken lines show the pattern of the main antenna and solid lines show the pattern of the multiplied output with a reduction in side lobes as well as a reduction in a beam width. It can be seen from these patterns that it is possible to obtain the pattern where the beam width is reduced by about half and side lobes are also reduced. In this simulation, the antenna system comprises such an antenna element described above, and the sizes of the first and second sub antennas can be made small compared to the size of the main antenna, therefore the total size is almost same as the size of an antenna with no reduction in beam width and side lobes.

As for a concrete example of an antenna system for the second embodiment, it is possible to use such example similar to what is shown in FIG. 6. And as for a multiplication circuit, when the multiplication is carried out in an analog way, common multiplier circuits or frequency modulators can be used. In order to perform multiplication digitally, known means are also available such a means that after the received signal is converted to a digital signal by an analog-to-digital converter, digital multiplication is carried out. An example of a multiplication circuit shown in FIG. 7 can be applied for this embodiment with no modification.

In the above second embodiment as well as in the first embodiment, single first sub antenna and single second sub antenna are also used but plural first sub antennas or plural second sub antennas can be used. When plural antennas are used for the first and second sub antenna, there are two following methods available for multiplication. In the first method, after adding each output of the first plural sub antennas and adding each output of the second plural sub antennas, the resultant each added output is multiplied by the output of the main antenna. In this case, the sub antennas receive more radio power than the single sub antenna, thus better antenna gains and better signal-to-noise ratios are obtained. In the second method, each output of the plural sub antennas is separately and directly multiplied by the output of the main antenna. In this case, it is possible to achieve more reduction in side lobes and more reduction in a beam width than those in the case of the single sub antenna.

The third embodiment of this invention is represented next. This embodiment relates to an apparatus and method for making a two-dimensional reduction in a beam width and a one-dimensional reduction in side lobes to achieve the third object of the present invention. In the antenna system for this antenna-pattern processing, a main antenna and a second sub antenna have the same constitution as those in the second embodiment shown in FIG. 8, while a first sub antenna comprises single half-wave dipole antenna arranged in such a way that the dipole axis coincides with the X axis in order to exhibit isotropic characteristics in the Y direction. The antenna beam of this antenna system is scanned in a direction other than either the X direction or the Y direction. As for a multiplication circuit, one shown in FIG. 7 can be applied to this embodiment with no modification.

When the antenna beam of such an antenna system is scanned in a direction other than either the X direction or the Y direction, a reduction in a beam width in the Y direction can be achieved in addition to the reduction in a beam width and side lobes in the X direction as a result of multiplication of the received signals of each antenna. The synthesized antenna patterns after multiplication is carried out are shown in FIGS. 10, 11 and 12.

Figure 10:
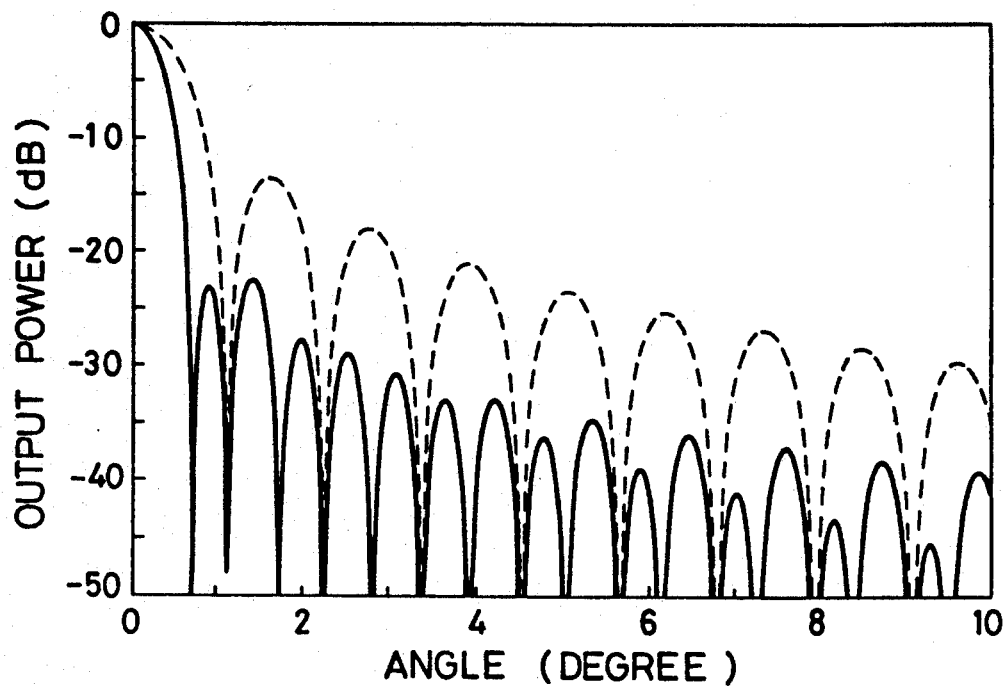
FIG. 10, 11 and 12 are graphs showing synthesized pattern with two-dimensionally reduced beam widths and one-dimensionally reduced side lobes obtained by the method for processing an antenna pattern according to a third embodiment.
Figure 11:
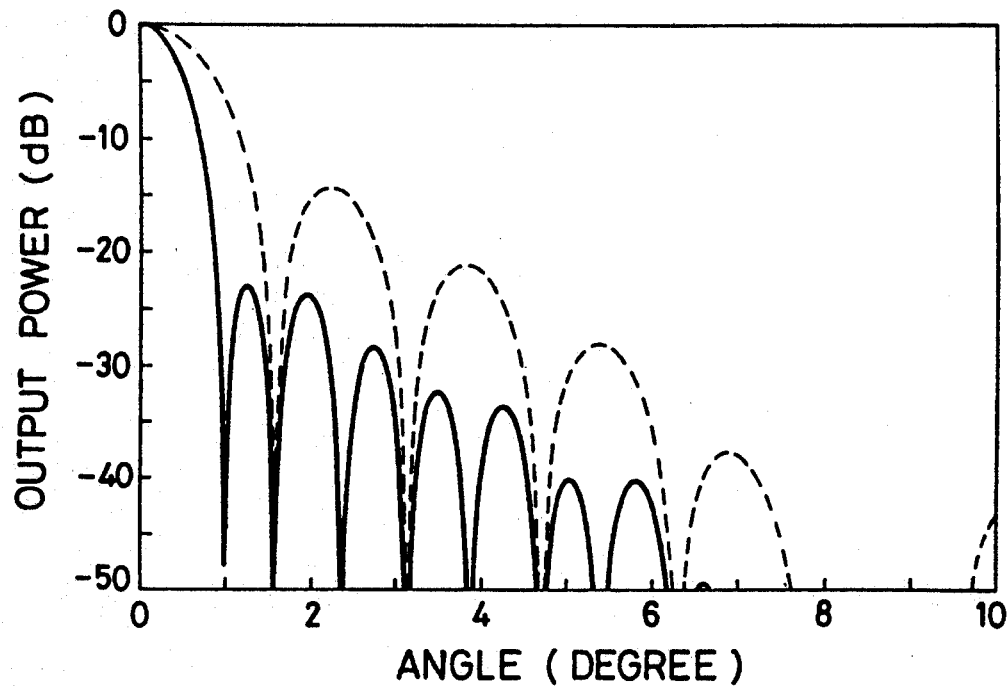
Figure 12:
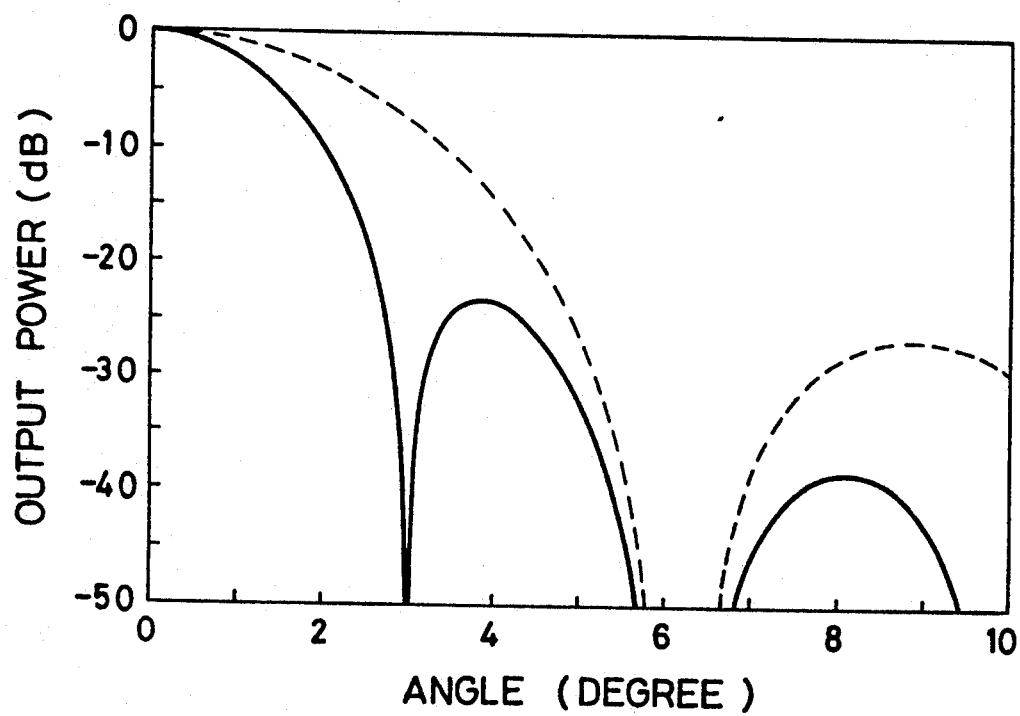

That is, FIGS. 10, 11 and 12 show the antenna patterns of the cases where the antenna beam is scanned in the direction at angles of 10°, 45° and 80° to the X axis respectively. In these figures, broken lines show patterns of the main antenna and solid lines show the patterns after two-dimensional reduction in beam widths and one-dimensional reduction in side lobes are performed by the method of this embodiment. As can be seen from these figures, when the angle between the beam-scanning direction and the X axis is not so large, a great reduction in side lobes is achieved, but when the angle is large, degree of reduction in side lobes becomes small. On the other hand, as far as beam width is concerned, the reduction is achieved independent of the angle between the beam-scanning direction and the X axis.

In this third embodiment as well as in the first and second embodiments, plural first sub antennas or plural second sub antennas can be used. And as for the multiplication method when plural antennas are used for the first and second sub antenna, it is possible to use the same two methods as those in the first and second embodiments described above.

The fourth embodiment of this invention is as follows. This embodiment relates to an apparatus and method for making a two-dimensional reduction in a beam width and a two-dimensional reduction in side lobes to achieve the fourth object of the present invention. The antenna system for this embodiment is modified from that of the second embodiment shown in FIG. 8 such that the first sub antenna does not have an isotropic antenna pattern in the Y direction. In such an antenna system, the antenna beam is scanned in a direction other than either the X direction or the Y direction. Therefore, the antenna system of the fourth embodiment is the same as that of the second embodiment except for the first sub antenna which does not have an isotropic characteristic in the Y direction. As for a multiplication circuit, one shown in FIG. 7 can be also applied to this embodiment with no modification.

Figure 13A:
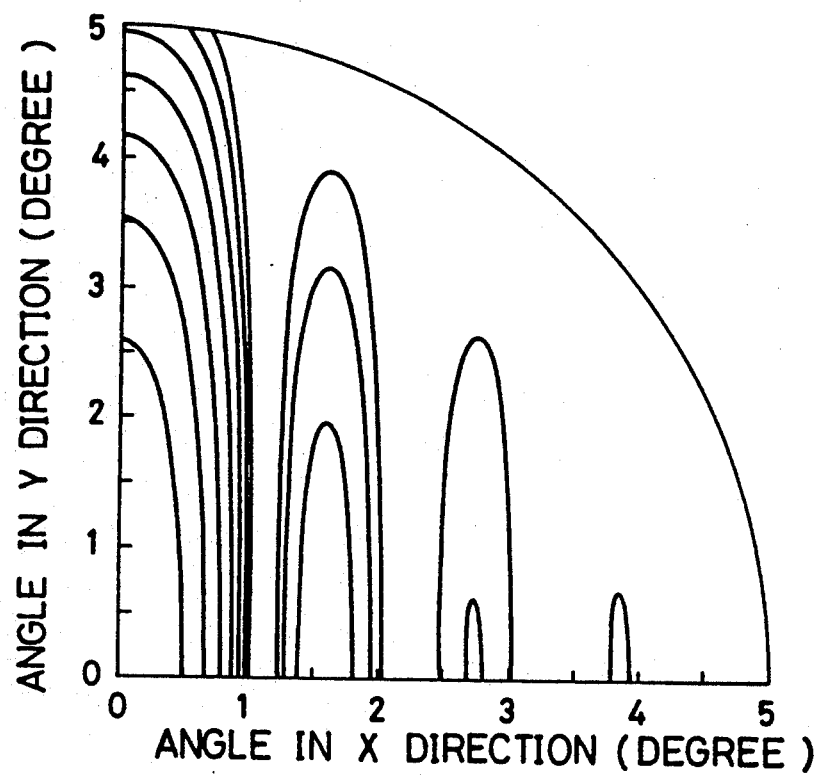
FIGS. 13A and 13B are graphs showing a synthesized pattern with two-dimensionally reduced beam widths and two-dimensionally reduced side lobes obtained by the method for processing an antenna pattern according to a fourth embodiment.
Figure 13B:
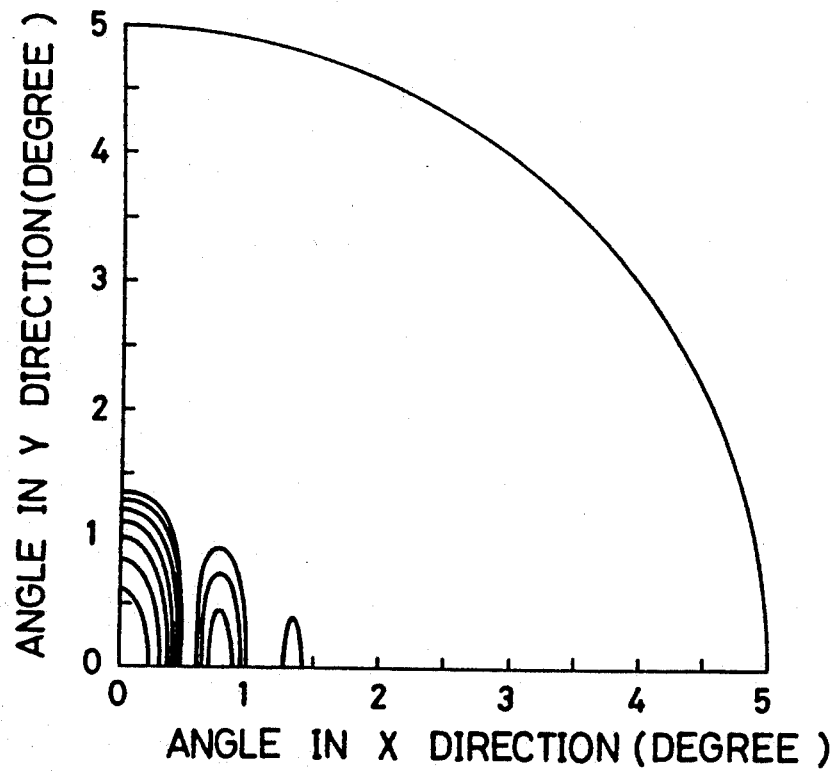

When the antenna beam of such an antenna system is scanned in a direction other than either the X direction or the Y direction, a two-dimensional reduction in a beam width and a two dimensional reduction in side lobes are achieved as a result of multiplication of the received signals of each antenna. Antenna patterns of this system are shown in FIG. 13A and 13B where the patterns are described by contour lines. FIG. 13A shows an antenna pattern of the main antenna and FIG. 13B shows the pattern with the two-dimensional reduction in the beam width and the two-dimensional reduction in side lobes where the patterns are described by contour lines for easy understanding. The contour lines correspond to $-3$, $-6$, $-9$, $-12$, $-15$, $-18$, and $-21$ dB respectively.

In this fourth embodiment, plural first sub antennas or plural second sub antennas can be used. As for the multiplication method when plural antennas are used for the first and second sub antenna, it is possible to use the same two methods as those in the first and second embodiments described above.

As described above, the first embodiment of the present invention provides an apparatus and method in which a first sub antenna and a second sub antenna are arranged adjoining the main antenna in the directions perpendicular to each other and an antenna beam is scanned in a direction other than above two directions and the received signals of each antenna are multiplied each other so that a two-dimensional reduction in a beam width is achieved thus the discrimination ability is improved. In the second embodiment, the first embodiment is modified such that the second sub antenna does not have an isotropic characteristics in the first direction and the beam is scanned in the first direction to achieve a one-dimensional reduction in side lobes as well as a one-dimensional reduction in a beam width. In the third embodiment, the beam of the antenna system similar to that of the second embodiment is scanned in a direction other than the first and second direction to achieve a two-dimensional reduction in a beam width and a one-dimensional reduction in side lobes. Furthermore, in the fourth embodiment, the first and second sub antenna are composed of such an antenna which does not have an isotropic pattern in the first and second direction respectively and the antenna beam is scanned in a direction other than the first and second direction to achieve a two-dimensional reduction in a beam width and a two-dimensional reduction in side lobes.

What is claimed is:

1. An apparatus for processing an antenna pattern having an antenna system, comprising:
   a main antenna for receiving radio waves;
   one or more first sub antennas adjoining said main antenna in a first direction which is the orientation of a beam width to be reduced of said main antenna, wherein the respective beam axes of said first sub antennas coincide with the beam axis of said main antenna;
   one or more second sub antennas adjoining said main antenna in a second direction perpendicular to said first direction and the respective beam axes of said second sub antennas coincide with the beam axis of said main antenna; and
   a multiplying means connected to said main antenna and said first and second sub antennas,
   wherein an antenna beam of said antenna system is scanned in a direction other than said first direction and said second direction,
   a first signal received with said main antenna is multiplied by a second signal received with said first sub antennas which is in phase with said first signal to produce a resultant multiplied output signal; and
   the resultant multiplied output signal is multiplied by a third signal received with said second sub antennas which is in phase with said resultant multiplied output signal.

2. An apparatus for processing an antenna pattern as recited in claim 1 wherein said antenna system has a plurality of said first sub antennas and a plurality of said second sub antennas wherein after each signal received with each of said first sub antennas is added to each other and each signal received with each of said second sub antennas is added to each other, multiplication is sequentially carried out between the resultant added signal of said first sub antennas and the resultant added signal of said second sub antennas and said first signal received with said main antenna.

3. An apparatus for processing an antenna pattern as recited in claim 1 wherein said antenna system has a plurality of said first sub antennas and a plurality of said second sub antennas wherein multiplication is sequentially carried out between each signal received with each of said plural first sub antennas and each signal received with each of said plural second sub antennas and said first signal received with said main antenna.

4. An apparatus for processing an antenna pattern having an antenna system, comprising:
   a main antenna for receiving radio waves;
   one or more first sub antennas adjoining said main antenna in a first direction which is the orientation of a beam width to be reduced of said main antenna, wherein the respective beam axes of said first sub antennas coincide with the beam axis of said main antenna;
   one or more second sub antennas which do not have an isotropic antenna pattern in said first direction said second sub antennas adjoining said main antenna in a second direction perpendicular to said first direction and the respective bema axes of said second sub antennas coincide with the beam axis of said main antenna; and
   a multiplying means connected to said main antenna and said first and second sub antennas,
   wherein an antenna beam of said antenna system is scanned in said first direction,
   a first signal received with said main antenna is multiplied by a second signal received with said first sub antennas which is in phase with said first signal to produce a resultant multiplied output signal; and
   the resultant multiplied output signal is multiplied by a third signal received with said second sub antennas which is in phase with said resultant multiplied output signal.

5. An apparatus for processing an antenna pattern as recited in claim 4 wherein said antenna system has a plurality of said first sub antennas and a plurality of said second sub antennas wherein after each signal received with each of said first sub antennas is added to each other and each signal received with each of said second sub antennas is added to each other, multiplication is sequentially carried out between the resultant added signal of said first sub antennas and the resultant added signal of said second sub antennas and said first signal received with said main antenna.

6. An apparatus for processing an antenna pattern as recited in claim 4 wherein said antenna system has a plurality of said first sub antennas and a plurality of said second sub antennas wherein multiplication is sequentially carried out between each signal received with each of said plural first sub antennas and each signal received with each of said plural second sub antennas and said first signal received with said main antenna.

7. An apparatus for processing an antenna pattern having an antenna system, comprising:
   a main antenna for receiving radio waves;
   one or more first sub antennas adjoining said main antenna in a first direction which is the orientation of a beam width to be reduced of said main antenna, wherein the respective beam axes of said first sub antennas coincide with the beam axis of said main antenna;
   one or more second sub antennas which do not have an isotropic antenna pattern in said first direction said second sub antennas adjoining said main antenna in a second direction perpendicular to said first direction and the respective beam axes of said second sub antennas coincide with the beam axis of said main antenna; and
   a multiplying means connected to said main antenna and said first and second sub antennas,
   wherein an antenna beam of said antenna system is scanned in a direction other than said first direction and said second direction,
   a first signal received with said main antenna is multiplied by a second signal received with said first sub antennas which is in phase with said first signal to produce a resultant multiplied output signal; and
   the resultant multiplied output signal is multiplied by a third signal received with said second sub antennas which is in phase with said resultant multiplied output signal.

8. An apparatus for processing an antenna pattern as recited in claim 7 wherein said antenna system has a plurality of said first sub antennas and a plurality of said second sub antennas, wherein after each signal received with each of said first sub antennas is added to each other and each signal received with each of said second sub antennas is added to each other, multiplication is sequentially carried out between the resultant added signal of said first sub antennas and the resultant added signal of said second sub antennas and said first signal received with said main antenna.

9. An apparatus for processing an antenna pattern as recited in claim 7 wherein said antenna system has a plurality of said first sub antennas and a plurality of said second sub antennas wherein multiplication is sequentially carried out between each signal received with each of said plural first sub antennas and each signal received with each of said plural second sub antennas and said first signal received with said main antenna.

10. An apparatus for processing an antenna pattern having an antenna system, comprising:
a main antenna for receiving radio waves;
one or more first sub antennas which do not have an isotropic antenna pattern in a second direction perpendicular to a first direction which is the orientation of a beam width to be reduced of said main antenna, wherein said first sub antennas adjoin said main antenna in said first direction and respective beam axes of said first sub antennas coincide with the beam axis of said main antenna; and
one or more second sub antennas which do not have an isotropic antenna pattern in said first direction wherein said second sub antennas adjoin said main antenna in said second direction perpendicular to said first direction and the respective beam axes of said second sub antennas coincide with the beam axis of said main antenna; and
a multiplying means connected to said main antenna and said first and second sub antennas,
wherein an antenna beam of said antenna system is scanned in a direction other than said first and said second direction,
a first signal received with said main antenna is multiplied by a second signal received with said first sub antennas which is in phase with said first signal to produce a resultant multiplied output signal; and
the resultant multiplied output signal is multiplied by a third signal received with said second sub antennas which is in phase with said resultant multiplied output signal.

11. An apparatus for processing an antenna pattern as recited in claim 10 wherein said antenna system has a plurality of said first sub antennas and a plurality of said second sub antennas wherein after each signal received with each of said first sub antennas is added to each other and each signal received with each of said second sub antennas is added to each other, multiplication is sequentially carried out between the resultant added signal of said first sub antennas and the resultant added signal of said second sub antennas and said first signal received with said main antenna.

12. An apparatus for processing an antenna pattern as recited in claim 10 wherein said antenna system has a plurality of said first sub antennas and a plurality of said second sub antennas wherein multiplication is sequentially carried out between each signal received with each of said plural first sub antennas and each signal received with each of said plural second sub antennas and said first signal received with said main antenna.

13. A method for processing an antenna pattern having an antenna system including a main antenna for receiving radio waves, one or more first sub antennas adjoining the main antenna in a first direction which is the orientation of a beam width to be reduced of said main antenna, wherein the respective beam axes of the first sub antennas coincide with the beam axis of the main antenna, one or more second sub antennas adjoining the main antenna in a second direction perpendicular to the first direction and the respective beam axes of the second sub antennas coincide with the beam axis of the main antenna, and a multiplier connected to said main antenna and to said first and second sub antennas, the method comprising the following steps:
scanning an antenna beam of said antenna system in a direction other than said first direction and said second direction;
multiplying a first signal received with said main antenna by a second signal received with said first sub antenna, which is in phase with said first signal to produce a resultant multiplied output signal;
multiplying said resultant multiplied output signal by a third signal received with said second sub antennas which is in phase with said resultant multiplied output signal.

14. A method for processing an antenna pattern as recited in claim 13, wherein the antenna system has a plurality of said first antennas and a plurality of said second antennas, comprising the additional steps of:
adding each signal received with each of said first sub antennas to each other;
adding each signal received with each of said second sub antennas to each other;
sequentially multiplying the resultant added signal of said first sub antennas and the resultant added signal of said second sub antennas and said first signal received with said main antenna.

15. A method for processing an antenna pattern as recited in claim 13 wherein said antenna system has a plurality of said first sub antennas and a plurality of said second sub antennas, comprising the following additional step of sequentially multiplying each signal received with each of a said plural first sub antennas and each signal received with each of said second plural sub antennas and said first signal received with said main antenna.

16. A method for processing an antenna pattern having an antenna system including a main antenna for receiving radio waves, one or more first sub antennas adjoining said main antenna in a first direction which is the orientation of a beam width to be reduced of said main antenna, wherein the respective beam axes of said first sub antennas coincide with the beam axis of said main antenna, one or more second sub antennas which do not have an isotropic antenna pattern in said first direction, said second sub antennas adjoining said main antenna in a second direction perpendicular to said first direction and the respective beam axes of said second sub antennas coincide with the beam axis of said main antenna, and a multiplying means connected to said main antenna and said first and second sub antennas, the method comprising the following steps:
scanning an antenna beam of said antenna system in said first direction;
multiplying a first signal received with said main antenna by a second signal received with said first sub antenna, which is in phase with said first signal to produce a resultant multiplied output signal;
multiplying said resultant multiplied output signal by a third signal received with said second sub antennas which is in phase with said resultant multiplied output signal.

17. A method for processing an antenna pattern as recited in claim 16, wherein the antenna system has a plurality of said first antennas and a plurality of said second antennas, comprising the additional steps of:
- adding each signal received with each of said first sub antennas to each other;
- adding each signal received with each of said second sub antennas to each other;
- sequentially multiplying the resultant added signal of said first sub antennas and the resultant added signal of said second sub antennas and said first signal received with said main antenna.

18. A method for processing an antenna pattern as recited in claim 16 wherein said antenna system has a plurality of said first sub antennas and a plurality of said second sub antennas, comprising the following additional step of sequentially multiplying each signal received with each of a said plural first sub antennas and each signal received with of said plural sub antennas and said first signal received with said main antenna.

19. A method for processing an antenna pattern having an antenna system including a main antenna for receiving radio waves, one or more first sub antennas adjoining said main antenna in a first direction which is the orientation of a beam width to be reduced of said main antenna, wherein the respective beam axes of said first sub antennas coincide with the beam axis of said main antenna, one or more second sub antennas which do not have an isotropic antenna pattern in said first direction, said second sub antennas adjoining said main antenna in a second direction perpendicular to said first direction and the respective beam axes of said second sub antennas coincide with the beam axis of said main antenna, and a multiplying means connected to said main antenna and said first and second sub antennas, the method comprising the following steps:
- scanning an antenna beam of said antenna system in a direction other than said first direction and said second direction;
- multiplying a first signal received with said main antenna by a second signal received with said first sub antenna, which is in phase with said first signal to produce a resultant multiplied output signal;
- multiplying said resultant multiplied output signal by a third signal received with said second sub antennas which is in phase with said resultant multiplied output signal.

20. A method for processing an antenna pattern as recited in claim 19, wherein the antenna system has a plurality of said first antennas and a plurality of said second antennas, comprising the additional steps of:
- adding each signal received with each of said first sub antennas to each other;
- adding each signal received with each of said second sub antennas to each other;
- sequentially multiplying the resultant added signal of said first sub antennas and the resultant added signal of said second sub antennas and said first signal received with said main antenna.

21. A method for processing an antenna pattern as recited in claim 19 wherein said antenna system has a plurality of said first sub antennas and a plurality of said second sub antennas, comprising the following additional step of sequentially multiplying each signal received with each of a said plural first sub antennas and each signal received with of said plural sub antennas and said first signal received with said main antenna.

22. A method for processing an antenna pattern having an antenna system including a main antenna for receiving radio waves, one or more first sub antennas which do not have an isotropic antenna pattern in a second direction perpendicular to a first direction which is the orientation of a beam width to be reduced of said main antenna, wherein said first sub antennas adjoin said main antenna in said first direction and respective beam axes of said first sub antennas coincide with the beam axis of said main antenna, one or more second sub antennas which do not have an isotropic antenna pattern in said first direction wherein said second sub antennas adjoin said main antenna in said second direction perpendicular to said first direction and the respective beam axes of said second sub antennas coincide with the beam axis of said main antenna and a multiplying means connected to said main antenna and said first and second sub antennas, the method comprising the following steps:
- scanning an antenna beam of said antenna system in a direction other than said first direction and said second direction;
- multiplying a first signal received with said main antenna by a second signal received with said first sub antenna, which is in phase with said first signal to produce a resultant multiplied output signal;
- multiplying said resultant multiplied output signal by a third signal received with said second sub antennas which is in phase with said resultant multiplied output signal.

23. A method for processing an antenna pattern as recited in claim 22, wherein the antenna system has a plurality of said first antennas and a plurality of said second antennas, comprising the additional steps of:
- adding each signal received with each of said first sub antennas to each other;
- adding each signal received with each of said second sub antennas to each other;
- sequentially multiplying the resultant added signal of said first sub antennas and the resultant added signal of said second sub antennas and said first signal received with said main antenna.

24. A method for processing an antenna pattern as recited in claim 22 wherein said antenna system has a plurality of said first sub antennas and a plurality of said second sub antennas, comprising the following additional step of sequentially multiplying each signal received with each of a said plural first sub antennas and each signal received with of said plural sub antennas and said first signal received with said main antenna.

* * * * *